Dec. 29, 1970     J. L. BLOOM     3,550,374

SPEED RESPONSIVE GOVERNORS

Filed July 23, 1968     2 Sheets-Sheet 1

INVENTOR
JOSEPH LEWIS BLOOM
BY
ATTORNEYS

Dec. 29, 1970   J. L. BLOOM   3,550,374
SPEED RESPONSIVE GOVERNORS
Filed July 23, 1968   2 Sheets-Sheet 2

INVENTOR
JOSEPH LEWIS BLOOM

United States Patent Office 3,550,374
Patented Dec. 29, 1970

3,550,374
SPEED RESPONSIVE GOVERNORS
Joseph Lewis Bloom, Baie d'Urfe, Québec, Canada, assignor to Joseph Lucas (Industries) Limited, Birmingham, England
Filed July 23, 1968, Ser. No. 746,876
Int. Cl. F01c 17/06; F02c 9/08; G01p 15/02
U.S. Cl. 60—39.28        3 Claims

ABSTRACT OF THE DISCLOSURE

A speed responsive governor for controlling fuel supplies to a gas turbine engine comprising an engine driven element to control fuel flow, a first lever angularly movable in response to engine speed changes, a first cam surface on the first lever, an angularly movable element spring loaded against the cam surface, a control lever to affect angular movement of the angularly movable element to vary the load on the driven element, a cam connected to the angularly movable element for movement therewith, and a cam follower connected to the control lever angular movement of the control lever resulting in linear variation in fuel flow.

---

This invention relates to speed responsive governors for controlling fuel supplies to gas turbine engines, and is a modification of the invention described and claimed in the specification of our U.S. Pat. No. 3,382,674.

In that specification there is described. a speed responsive governor comprising a driven element, a first lever which is angularly movable in response to changes in the speed of the driven element, said first lever having thereon a cam surface, a second lever having a cam surface spaced from, but presented towards, said first mentioned cam surface, means responsive to changes in a predetermined parameter for varying the position of the second lever in a direction so that its cam surface is moved towards or away from the cam surface on the first lever, a member which can be moved angularly, and a spring movable with said member and acting betwen the cam surface on the first and second levers respectively, angular movement of the member and spring varying the movement of the spring force action on the first lever to provide a variable loading on the driven element.

A disadvantage of the arrangement disclosed in our U.S. Pat. No. 3,382,674 is that there is a non-linear relationship between movement of the operator control and the resultant variation in fuel flow and hence engine speed.

An object of the present invention is to provide an arrangement whereby a linear relationship between the operator control and resultant fuel flow is achieved.

According to the present invention there is provided a speed responsive governor comprising a driven element arranged to be driven by an engine to control the flow of fuel to the engine, a first lever which is angularly movable in response to changes in the speed of the driven element, a first cam surface on said first lever, an angularly movable element which is spring loaded against said first cam surface, a control lever for effecting angular movement of the angularly movable element along said surface, in order to vary the loading on the driven element, a cam connected to the angularly movable element for angular movement therewith, and a cam follower operatively connected to the control lever, the profile of the cam on the angularly movable element being shaped so that angular movement of the control lever results in a linear variation in fuel flow to the engine.

Figure 1:
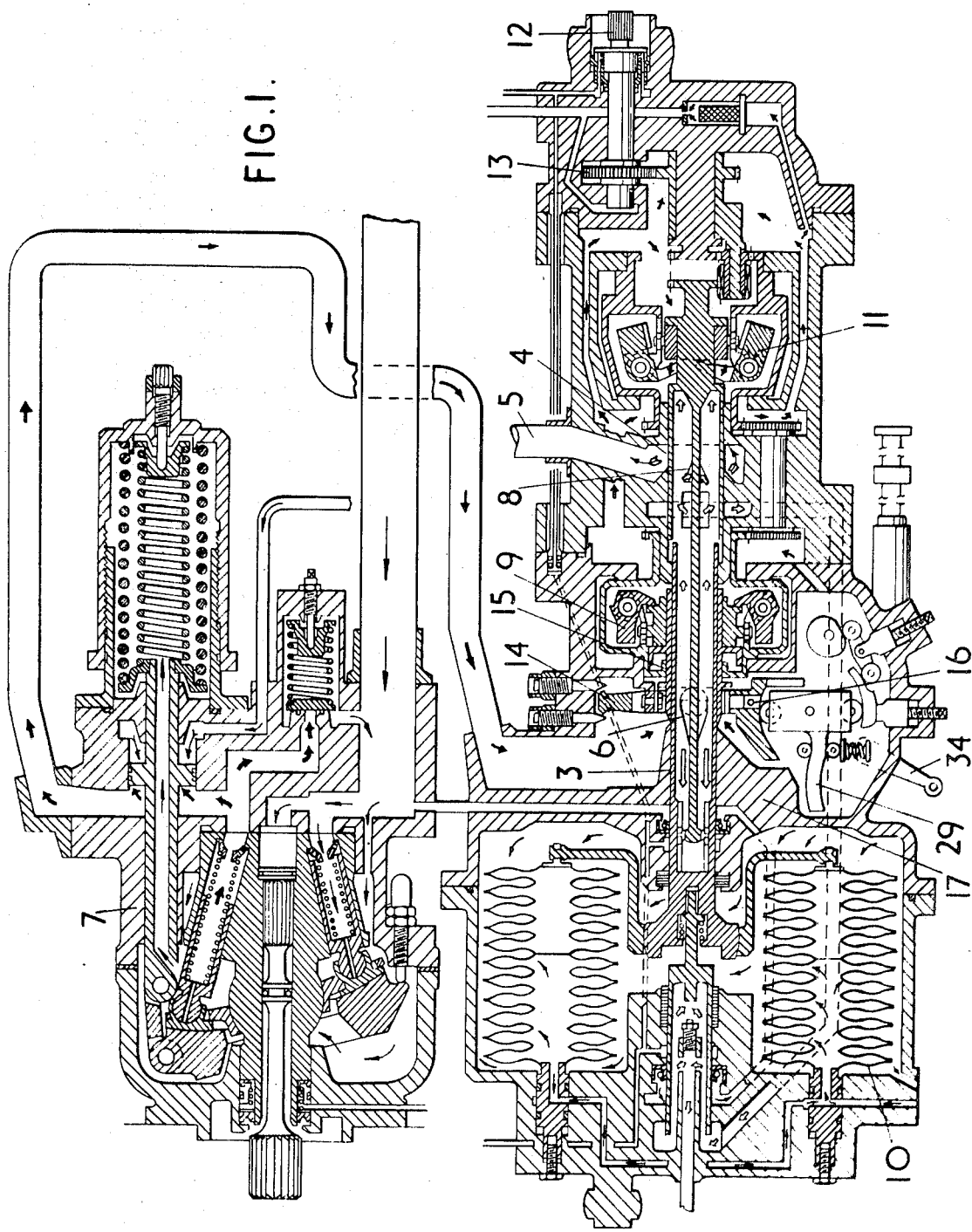
Figure 2:
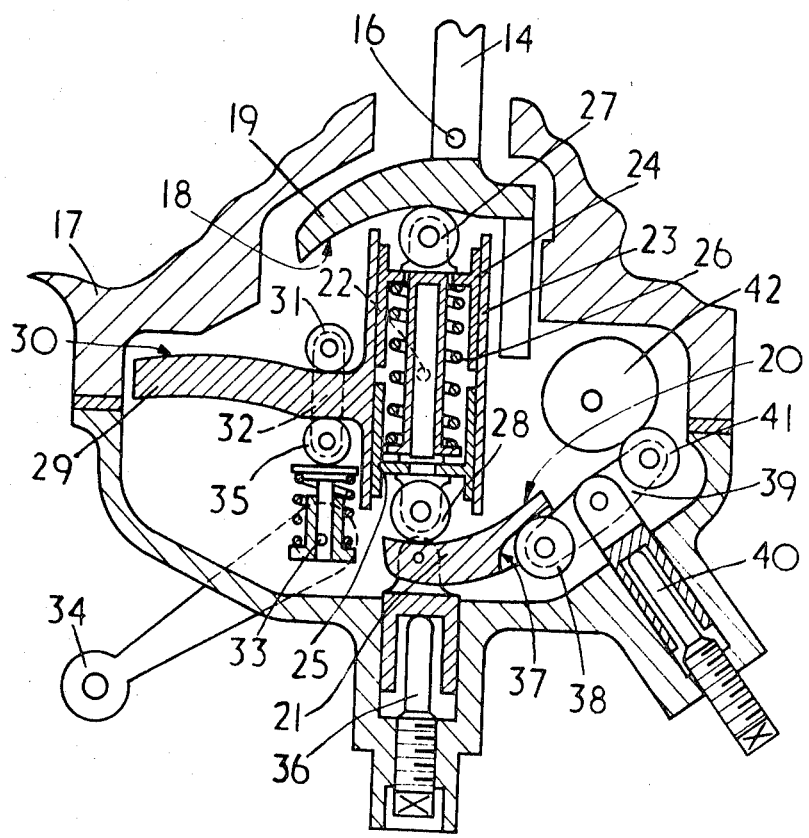

An embodiment of the invention will now be described by way of example, with reference to accompanying drawing in which:

FIG. 1 is a diagrammatic longitudinal sectional view of part of a fuel system for a gas turbine engine, and
FIG. 2 is a cross-sectional view of a portion of the system on an enlarged scale.

As shown in FIG. 1 of the drawings, a fuel supply system for a gas turbine engine includes a pair of co-axial, axially movable and apertured sleeves 3, 4 the axial position of which determine the flow of fuel which can reach the engine, with which the system is associated, through an outlet passage 5. The fuel reaches the interior of the sleeves 3, 4 through a set of openings 6 in the sleeve 3 from an engine driven pump 7 and leaves it through a set of openings 8 in the other sleeve 4. Axial positioning of the sleeve 3 is determined in accordance with pressures derived from the compressor stage of the engine by means of a capsule assembly 10. A set of governor weights 11 also acts on the sleeve 4, these weights 11 being rotated, as are the sleeves 3, 4 by the engine through a shaft 12 and gearing 13. Surrounding the sleeve 3 is an axially movable outer sleeve 15, the axial position of which, together with the axial position of the sleeve 3, determines the size of the openings 6 which is available for flow of fuel therethrough. The position of the sleeve 15 is determined by a set of weights 9 driven by the engine. The movement of the sleeve 15 in response to the movement of the weights 9 is modified by the mechanism forming the subject of the application. The mechanism includes a hollow lever 14 which engages the sleeve 15. This lever is pivotally mounted on fixed structure 17 at 16.

The mechanism, which is the subject of the present invention, is illustrated on an enlarged scale in FIG. 2, and provides a means whereby the governor setting can be adjusted by an operator. In addition, the mechanism permits the operator setting to be modified in accordance with temperature changes. In this instance the temperature changes are those in the jet pipe or exhaust of the engine, the system of this example being used on an aircraft.

As shown best in FIG. 2, the lever 14, against which the governor weights apply a force, has at its lower end an arcuate cam surface 18 on a laterally extending arm 19 at the lower end of the lever 14.

A second cam surface 20 is provided on a lever 21 and the cam surfaces 18 and 20 are disposed about an axis 22 so that they lie substantially diametrically opposite one another, on a circle described about the axis 22. Diametrically disposed between the two cam surfaces 18 and 20 is a unit comprising a cage 23 which houses a pair of cups 24, 25 urged apart by means of a spring 26. Each cup 24, 25 carries a roller 27, 28 respectively which acts on the cam surfaces 18, 20 respectively. The cage 23 has an integral lateral extension 29 having a cam surface 30 of predetermined profile and which is acted upon by a cam follower comprising a fixed roller 31 carried on a link 32 which is pivotal about an axis 33 under the influence of an angularly movable operator's control lever 34. A spring loaded roller 35 is also carried by the link 32 and co-operates with the roller 31 to provide a track for the extension 29.

The lever 21 is pivotally mounted on an adjustable rod 36 on the support structure 17, the lever 21 carrying at a position spaced from the connection with the rod 36, a cam surface 37 on which acts a roller 38 carried by one end of an arm 39. The arm 39 is pivotally mounted intermediate its ends on a further adjustable rod 40, the opposite end of the arm 39 remote from the roller 38 carrying a further roller 41 which is engageable by a cam 42. The cam 42 is angularly movable by means of a motor or other mechanism (not shown) which receives a signal from a device responsive to changes in a parameter which, in this case, is jet pipe temperature in the engine. Adjustment of the rod 40 and hence the arm 39 controls the force exerted by the spring 26 on the lever 14 through the intermediary of the arm 19. In this way, pre-setting of the governor response can be effected.

In the position of the mechanism as shown in FIG. 2, the roller 27 acts on the cam surface 18 to apply a moment to the arm 19 about the pivot 16, and this exerts a small force in opposition to the force exterted by the governor weights 9 on the lever 14. This force is adjustable by means of the rod 36 and corresponds to a force required to maintain the engine fuel supply at a value for an idling speed. It will be noted that the roller 28 bears on the cam surface 20 in a position coincident with the axis of the rod 36 so that any movement of the arm 19 in response to changes in the position of the arm 39 have substantially no effect upon the force exerted by the spring 26.

In operation of the mechanism of the invention, the pilot, if he wishes to increase engine speed, moves the control lever 34 angularly in an anti-clockwise direction as shown in FIG. 2. This causes the link 32 and its associated rollers to move angularly in the same direction, and in doing so the roller 31 rides along the cam surface 30 and causes the cage 23, with its associated rollers 27, 28, to pivot about the axis 22. The profile of the cam surface 30 is calculated so that angular movement of the operator's control lever 34 effects a predetermined pivotal movement of the cage 23 and rollers 27, 28 in order to produce a fuel flow which has a linear relationship to angular movement of the lever 24. The cam form varies with the magnitude of the forces applied in the apparatus and is calculated on the basis of these for any particular apparatus.

Angular movement of the cage 23 causes the roller 27 to move along the cam surface 18 and thus increase the moment applied about the axis 16 and thereby increases the force acting against axial movement of the sleeve 15 under the influence of the governor weights 9. This enables the fuel supply to the engine, and as a result the engine speed, to be increased, in a manner not shown, until the force exerted by the spring 26 is balanced by a new force exerted by the governor weights 9 and whereupon the lever 14 is restored to its original position.

Any change in the temperature in the jet pipe causes angular movement of the cam 42 with a consequential change in the position of the lever 21. This changes the force exerted by the spring 26 to provide for a change in the force exerted by the governor weights 9 as described.

It is to be realised that the movements involved in the above described apparatus are small and the cam surfaces 18 and 20 are seldom out of their concentric disposition to any substantial extent. This is desirable in that it reduces frictional resistance to angular movement of the rollers 27, 28 along the surfaces 18, 20 respectively to a minimum.

Having thus described my invention what I claim as new and desire to secure by Letters Patent is:

1. A speed responsive governor comprising a driven element arranged to be driven by an engine to control the flow of fuel to the engine, a first lever which is angularly movable in response to changes in the speed of the driven element, a first cam surface on said first lever, an angularly movable element which is spring loaded against said first cam surface, a control lever for effecting angular movement of the angularly movable element along said surface, in order to vary the loading on the driven element, a cam connected to the angularly movable element for angular movement therewith, and a cam follower operatively connected to the control lever, the profile of the cam on the angularly movable element being shaped so that angular movement of the control lever results in a linear variation in fuel flow to the engine.

2. A speed responsive governor as claimed in claim 1 in which the angularly movable element carries a further cam follower engageable with a further cam, the further cam being adjustable to cause the angularly movable element to apply a force to the first lever so that fuel in sufficient quantities for maintaining idling of the engine is provided.

3. A speed responsive governor as claimed in claim 2 in which the further cam is mounted upon a member, the position of which changes, in use, with changes in engine operating temperatures.

References Cited

UNITED STATES PATENTS

| | | | |
|---|---|---|---|
| 2,572,096 | 10/1951 | Baker | 137—33X |
| 3,332,233 | 7/1967 | McQueen | 60 39.28 |
| 3,349,557 | 10/1967 | Johnson | 60—39.28 |
| 3,382,674 | 5/1968 | Bloom | 60—39.28 |
| 3,403,507 | 10/1968 | Schuster | 60—39.28 |

AL LAWRENCE SMITH, Primary Examiner

U.S. Cl. X.R.

73—541